United States Patent
Shi et al.

(10) Patent No.: US 9,485,740 B2
(45) Date of Patent: Nov. 1, 2016

(54) SIGNAL TRANSMISSION METHOD, COMMUNICATIONS EQUIPMENT, AND SYSTEM

(71) Applicant: Huawei Technologies Co., Ltd., Shenzhen (CN)

(72) Inventors: Cao Shi, Shenzhen (CN); Xiaoyue He, Shenzhen (CN); Guozhu Long, Santa Clara, CA (US); Dong Wei, Austin, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 14/502,352

(22) Filed: Sep. 30, 2014

(65) Prior Publication Data

US 2015/0016344 A1 Jan. 15, 2015

Related U.S. Application Data

(63) Continuation of application No. PCT/CN2012/075093, filed on May 4, 2012.

(51) Int. Cl.
| | |
|---|---|
| *H04B 3/32* | (2006.01) |
| *H04W 52/24* | (2009.01) |
| *H04W 24/02* | (2009.01) |
| *H04B 3/06* | (2006.01) |

(52) U.S. Cl.
CPC .............. *H04W 52/243* (2013.01); *H04B 3/06* (2013.01); *H04W 24/02* (2013.01); *H04B 3/32* (2013.01)

(58) Field of Classification Search
CPC ....... H04B 1/1027; H04L 1/20; H04L 1/243; H04L 12/2898; H04L 1/26; H04L 1/4013; H04L 5/003; H04L 5/0064; H04M 3/26; H04M 3/304; H04Q 2213/13199; H04Q 2213/199
USPC ....... 375/220, 221, 222, 224, 225, 227, 288, 375/295, 316
See application file for complete search history.

(56) References Cited

U.S. PATENT DOCUMENTS

| | | | | |
|---|---|---|---|---|
| 2001/0055332 | A1* | 12/2001 | Sadjadpour | H04B 3/32 375/222 |
| 2003/0099286 | A1* | 5/2003 | Graziano | H04L 1/0001 375/222 |
| 2004/0064307 | A1 | 4/2004 | Scalart et al. | |

(Continued)

FOREIGN PATENT DOCUMENTS

| | | |
|---|---|---|
| CN | 1488136 A | 4/2004 |
| CN | 1917497 A | 2/2007 |

(Continued)

Primary Examiner — Siu Lee
(74) Attorney, Agent, or Firm — Slater Matsil, LLP

(57) ABSTRACT

Embodiments of the present invention disclose a signal transmission method. A first correspondence is acquired between both a PSD of transmitted signals of the first communications equipment and a PSD of transmitted signals of a second communications equipment and a signal-to-noise ratio of received signals of the first communications equipment. A second correspondence is acquired between the signal-to-noise ratio of received signals of the first communications equipment and the number of bits for bearing signals. An optimization algorithm is used to calculate a PSD of transmitted signals of the first communications equipment and a PSD of transmitted signals of the second communications equipment.

17 Claims, 3 Drawing Sheets

(56) References Cited

U.S. PATENT DOCUMENTS

2006/0153178 A1* 7/2006 Cendrillon ............ H04L 5/0046
370/368
2011/0080937 A1* 4/2011 Kim ...................... H04L 5/0007
375/219
2014/0119536 A1* 5/2014 Strobel .................... H04B 3/32
379/406.01

FOREIGN PATENT DOCUMENTS

| CN | 101778183 A | 7/2010 |
| CN | 102197621 A | 9/2011 |
| CN | 102387272 A | 3/2012 |
| EP | 1213848 A1 | 6/2002 |
| KR | 20050040369 A | 5/2005 |
| KR | 100844176 B1 | 7/2008 |
| WO | 2011058126 A1 | 5/2011 |

* cited by examiner

SIGNAL TRANSMISSION METHOD, COMMUNICATIONS EQUIPMENT, AND SYSTEM

This application is a continuation of International Application No. PCT/CN2012/075093, filed on May 4, 2012, which is hereby incorporated by reference in its entirety.

TECHNICAL FIELD

The present invention relates to the field of communications technologies, and in particular, to a signal transmission method, a communications equipment, and a system.

BACKGROUND

With the development of various types of broadband services, customers have increasing requirements for rates, a current long-term requirement for a user broadband rate in the industry may reach 400 Mb/s, and a broadband using the traditional digital subscriber line (DSL) technology has no competitive edge. The Fiber to the Home (FTTH) technology, represented by a passive optical network, has been able to meet the bandwidth requirement, but problems that are difficult to resolve exist in many aspects such as investment costs, laying and operation and maintenance, and stability, and copper access technologies such as DSL have obvious relative advantages in aspects such as investment costs and operation and maintenance.

Carriers wish to provide broadband access services that meet user requirements in a relatively long time in the future while existing copper wire resource investments are protected and used. Such copper wire technology expected by the carriers are mainly oriented to a scenario in which a length of a remaining copper wire is approximately 200 m, may provide a total rate of up to 500 M, and also features low complexity, low power consumption, and easy operation and maintenance. With deepening of construction of various types of Fiber to the x (FTTx), a distance between a fiber and a user is becoming increasingly short, a length of a remaining copper wire connecting a fiber to a user equipment is even less than 200 m, and the Orthogonal Frequency Division Multiplexing (OFDM) technology that meets the requirement for a higher rate, reduces transmission distances, and spreads the spectrum is an inevitable choice based on a current copper wire technology.

An OFDM system that uses the Overlapped Spectrum Duplex (OSD) technology to transmit and receive signals is called an OSD-OFDM system. The system replaces generally used frequency division duplex or time division duplex, enabling the uplink and downlink signals to completely multiplex channels on all frequency bands at the same time, and spectral efficiency is expected to be doubled.

In the OSD-OFDM system in the prior art, a power spectral density (PSD) of transmitted signals between a headend and a peer end is generally a value used according to a specification. In an actual application, however, different scenarios have different channel attenuation, and transmitting uplink and downlink signals on all frequency bands or retaining a same power spectral density for transmitting signals may lead to a relatively large echo signals that are looped back in a hybrid loopback manner to a receiver of a local end, which increases interference of transmitted signals in received signals and deteriorates system performance.

SUMMARY

Embodiments of the present invention provide a signal transmission method, a communications equipment, and a system for optimizing a PSD of transmitted signals to enable a system to obtain optimal performance.

Embodiments of the invention include a signal transmission method. A first communications equipment acquires a first correspondence between both a PSD of transmitted signals of the first communications equipment and a PSD of transmitted signals of a second communications equipment and a signal-to-noise ratio of received signals of the first communications equipment. The signal-to-noise ratio of received signals of the first communications equipment is a ratio of desired signals to noise. The desired signals and the noise are in signals received by the first communications equipment. A second correspondence between the signal-to-noise ratio of received signals of the first communications equipment and the number of bits for bearing signal is acquired. An optimization algorithm is used to calculate a PSD of transmitted signals of the first communications according to the first correspondence and the second correspondence equipment and a PSD of transmitted signals of the second communications equipment according. The PSDs are PSDs when a rate of a line from the first communications equipment to the second communications equipment is the maximum.

Embodiments of the invention also include a communications equipment. An acquiring module is configured to acquire a first correspondence between both a PSD of transmitted signals of the communications equipment and a PSD of transmitted signals of a peer communications equipment and a signal-to-noise ratio of received signals of the communications equipment and to acquire a second correspondence between the signal-to-noise ratio of received signals of the communications equipment and the number of bits for bearing signals. The signal-to-noise ratio of received signals of the communications equipment is a ratio of desired signals to noise. The desired signals and the noise are in signals received by the communications equipment. A processing module is configured to, according to the first correspondence and the second correspondence, use an optimization algorithm to calculate a PSD of transmitted signals of the communications equipment and a PSD of transmitted signals of the peer communications equipment, where the PSDs are PSDs when a rate of a line from the communications equipment to the peer communications equipment is the maximum. A transmitting module is configured to transmit signals according to the PSD of transmitted signals of the communications equipment calculated by the processing module.

In another embodiment, a communications system includes a first communications equipment serving as a central office equipment and a second communications equipment serving as a terminal equipment. The first communications equipment and the second communications equipment are connected by using a channel. The first communications equipment acquires a first correspondence between both a PSD of transmitted signals of the first communications equipment and a PSD of transmitted signals of the second communications equipment and a signal-to-noise ratio of received signals of the first communications equipment. The signal-to-noise ratio of received signals of the first communications equipment is a ratio of desired signals to noise. The desired signals and the noise are in signals received by the first communications equipment. The first communications equipment acquires a second correspondence between the signal-to-noise ratio of received signals of the first communications equipment and the number of bits for bearing signals. According to the first correspondence and the second correspondence, the first communications equipment uses an optimization algorithm to calculate a PSD of transmitted signals of the first communications equipment and a PSD of transmitted signals of the second communications equipment. The PSDs are PSDs when a rate of a line from the first communications equipment to the second communications equipment is the maximum. The first communications equipment and the second communications equipment transmit signals according to the calculated PSDs.

In the technical solutions provided in the embodiments of the present invention, a better PSD level of transmitted signals is acquired, in an actual application scenario, by acquiring a relationship between PSDs of transmitted signals and a signal-to-noise ratio of received signals and a relationship between a signal-to-noise ratio and the number of bits for bearing signals. Transmitting signals according to the PSDs may reduce echo signals that are looped back in hybrid loopback manner to a receiver of a local end, so as to reduce interference of transmitted signals in received signals and increase a line rate in a system.

BRIEF DESCRIPTION OF THE DRAWINGS

To describe the technical solution in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solution in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention provide a signal transmission method and a communications equipment, which are separately detailed in the following.

Figure 1:
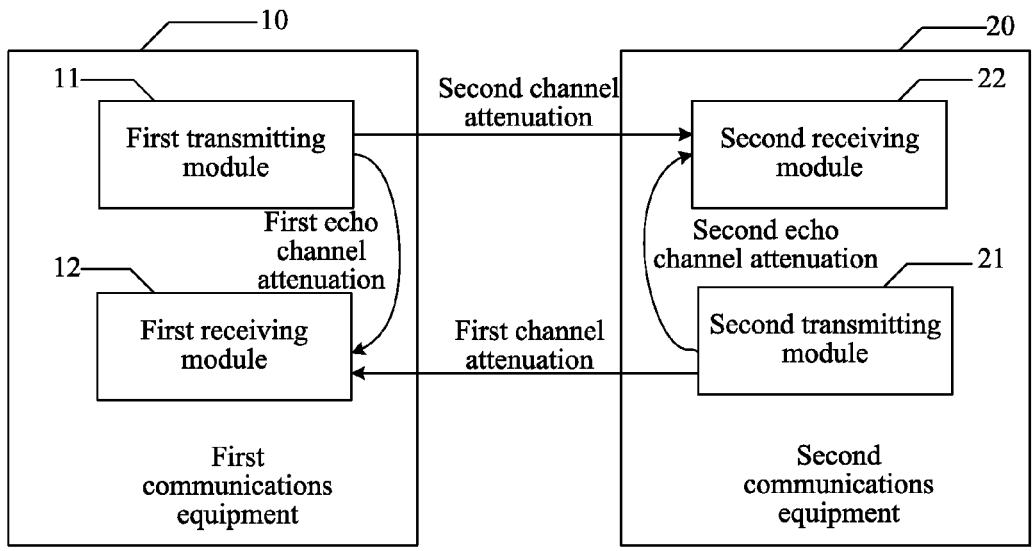
FIG. 1 is a schematic diagram of a communications system according to an embodiment of the present invention.

Referring to FIG. 1, a communications system according to an embodiment of the present invention includes a first communications equipment 10 and a second communications equipment 20. The first communications equipment 10 includes a first transmitting module 11 configured to transmit signals and a first receiving module 12 configured to receive signals. The second communications equipment 20 includes a second transmitting module 21 configured to transmit signals and a second receiving module 22 configured to receive signals. The signals transmitted by the first transmitting module 11 or the second transmitting module 21 are all received simultaneously by the first receiving module and the second receiving module. The first receiving module 12 may receive signals that are transmitted by the first transmitting module 11 and have undergone a first echo channel attenuation gain and signals that are transmitted by the second transmitting module 21 and have undergone a first channel attenuation gain. The second receiving module 22 may receive signals that are transmitted by the second transmitting module 21 and have undergone a second echo channel attenuation gain and signals that are transmitted by the first transmitting module 11 and have undergone a second channel attenuation gain.

Generally, both the first communications equipment and the second communications equipment have N subcarriers for signal transmission. If PSDs of transmitted signals of the first communications equipment and the second communications equipment are the same and N sub-channels are included for the signal transmission it may be regarded that a PSD of each sub-channel is the same.

The first communications equipment is a central office equipment or a terminal equipment, and a corresponding second communications equipment is a terminal equipment or end office equipment. The following uses a first communications equipment as an example for description.

Figure 2:
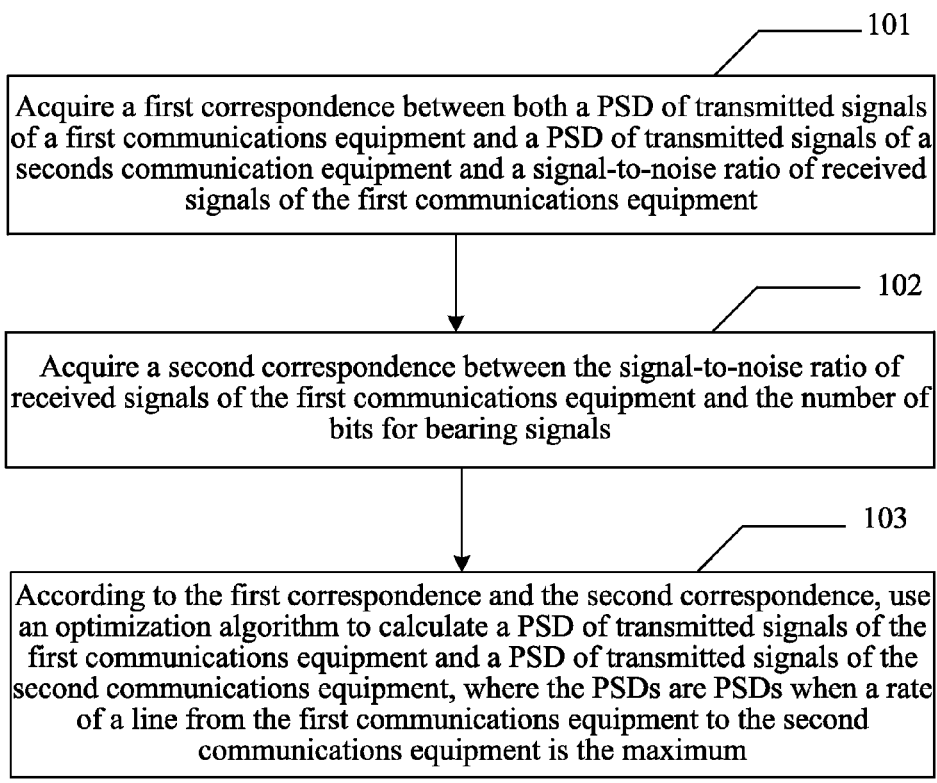
FIG. 2 is a schematic diagram of a first embodiment of a signal transmission method according to an embodiment of the present invention.

Referring to FIG. 2, a first embodiment of a signal transmission method according to an embodiment of the present invention includes the following steps.

101. Acquire a first correspondence between both a PSD of transmitted signals of a first communications equipment and a PSD of transmitted signals of a second communications equipment and a signal-to-noise ratio of received signals of the first communications equipment.

102. Acquire a second correspondence between the signal-to-noise ratio of received signals of the first communications equipment and the number of bits for bearing signals.

103. According to the first correspondence and the second correspondence, use an optimization algorithm to calculate a PSD of transmitted signals of the first communications equipment and a PSD of transmitted signals of the second communications equipment. The PSDs are PSDs when a rate of a line from the first communications equipment to the second communications equipment is the maximum.

Further, when a rate of a line from the first communications equipment to the second communications equipment is the maximum is specifically when the line rate is the maximum under a prerequisite that a certain bit error rate is ensured for transmitting signals from the first communications equipment to the second communications equipment.

It may be understood that, in step 103, the PSD of transmitted signals of the first communications equipment and the PSD of transmitted signals of the second communications equipment may be calculated, where the PSDs are PSDs when the rate of the line from the first communications equipment to the second communications equipment is lower than the maximum value but close to the maximum value, which is also based on a same idea and is only simple substitution by a common means. In addition, the optimization algorithm may be an enumeration algorithm or another algorithm. It should also be understood that, acquiring, according to the first correspondence and the second correspondence, the PSD of transmitted signals of the first communications equipment and the PSD of transmitted signals of the second communications equipment when the line rate is the maximum is only an ordinary mathematical derivation process in this field, equivalent to calculating, according to three groups of conditions, values or ranges of two variables. Different algorithms only differ in complexity and do not cause substantial impacts on a final result. Because a specific algorithm is not the key point focused in this solution, further description is not provided herein.

In this embodiment, a better PSD level of transmitted signals is acquired, in an actual application scenario, by acquiring a relationship between PSDs of transmitted signals and a signal-to-noise ratio of received signals and a relationship between a signal-to-noise ratio and the number of bits for bearing signals. Transmitting signals according to the PSDs may reduce echo signals that are looped back in a hybrid loopback manner to a receiver of a local end, so as to reduce interference of transmitted signals in received signals and increase a line rate in a system, The signal-to-noise ratio of received signals of the first communications equipment is a ratio of desired signals to noise, where the desired signals and the noise are in signals received by the first communications equipment.

Further, step 101 specifically includes: acquiring, by using a relationship between the noise and both the PSD of transmitted signals of the first communications equipment and the PSD of transmitted signals of the second communications equipment, and a relationship between the desired signals and the PSD of transmitted signals of the first communications equipment, a relationship between both the PSD of transmitted signals of the first communications equipment and the PSD of transmitted signals of the second communications equipment and the signal-to-noise ratio of received signals of the first communications equipment, that is, the first correspondence.

Specifically, a size of the desired signals in received signals of the first communications equipment may be indicated by a PSD, which has undergone a first channel attenuation gain, of transmitted signals of the second communications equipment; a volume of the first channel attenuation gain may be acquired according to an attenuation parameter for a first channel; and generally, the desired signals can be acquired by adding the PSD of transmitted signals of the second communications equipment to the attenuation parameter for the first channel.

Further, the noise in the received signals of the first communications equipment are specifically composed of noise 1, noise 2, and noise 3.

The noise 1 is noise generated after the noise in the transmitted signals of the first communications equipment undergoes a first echo channel attenuation gain, where the noise in the transmitted signal of the first communications equipment is related to the PSD of transmitted signals of the first communications equipment, and a volume of the first echo channel attenuation gain undergone may be acquired according to an attenuation parameter for a first echo channel. Therefore, the noise 1 may be indicated by using a relational expression that includes the PSD of transmitted signals of the first communications equipment.

The noise 2 is noise generated after the noise in the transmitted signals of the second communications equipment undergoes the first channel attenuation gain. The noise in the transmitted signals of the second communications equipment is related to the PSD of transmitted signals of the second communications equipment, and the volume of the first channel attenuation gain undergone may be acquired according to the attenuation parameter for the first channel. Therefore, the noise 2 may be indicated by using a relational expression that includes the PSD of transmitted signals of the second communications equipment.

The noise 3 is noise generated when all signals received by the first communications equipment undergo analog-to-digital conversion. Values of all the signals received by the first communications equipment are determined by a value of the PSD, which has undergone the first echo channel attenuation gain, of transmitted signals of the first communications equipment, a value of the PSD, which has undergone the first channel attenuation gain, of transmitted signals of the second communications equipment, the noise 1, and the noise 2. Therefore, the noise 3 may be indicated by a relational expression that includes the PSD of transmitted signals of the first communications equipment and the PSD of transmitted signals of the second communications equipment.

Still further, the noise in the signals received by the first communications equipment includes background noise.

The second correspondence is a relationship between the signal-to-noise ratio of received signals of the first communications equipment and the number of bits for bearing signals and may be calculated by using the Shannon channel capacity formula.

Step 102 specifically includes: acquiring the following relational expression according to the Shannon channel capacity formula:

$$L = \Sigma \, \text{Log}_2(1 + \text{Theory\_SNR\_linear} / \text{SNR\_Gap\_Linear})$$

where L is a total capacity of N sub-channels, equivalent to the number of bits for bearing signals; $\text{Log}_2(1+\text{Theory\_SNR\_linear}/\text{SNR\_Gap\_Linear})$ is a capacity of each sub-channel; Theory_SNR_Linear is the signal-to-noise ratio of received signals of the first communications equipment; and SNR_Gap_Linear is a signal-to-noise ratio difference and a known quantity. And, the rate of the line from the first communications equipment to the second communications equipment is linerate, and linerate=L*symbol rate.

Further, the foregoing process is implemented in a case in which the PSD of transmitted signals of the first communications equipment and the PSD of transmitted signals of the second communications equipment are different. Nevertheless, if the PSD of transmitted signals of the first communications equipment and the PSD of transmitted signals of the second communications equipment are the same, operations may also be implemented according to the foregoing process, only with the PSD of transmitted signals of the first communications equipment and the PSD of transmitted signals of the second communications equipment being equivalent to a variable.

Before the foregoing step 101, the method may further include the following step, which is not shown in the figure.

100. Acquire the attenuation parameter for the first channel from the second communications equipment to the first communications equipment and the attenuation parameter for the first echo channel of the first communications equipment.

In this embodiment, in a case in which the second communications equipment transmits signals to the first communications equipment and the first communications equipment does not transmit signals, the first communications equipment may, by acquiring the PSD of transmitted signals of the second communications equipment and measuring the PSD of signals received by the first communications equipment, subtract the PSD of the signals received by the first communications equipment from the acquired PSD of transmitted signals of the second communications equipment to calculate the attenuation parameter for the first channel;

In a case in which the first communications equipment transmits signals to the second communications equipment and the second communications equipment does not transmit signals, the first communications equipment may also acquire the PSD of transmitted signals of the first communications equipment and measure the PSD of signals that have passed through an echo channel of the first communications equipment, and subtract the PSD of the signals that have passed through the echo channel of the first communications equipment from the PSD of transmitted signals of the first communications equipment to calculate the attenuation parameter for the first echo channel.

Further, an attenuation parameter for a second channel from the first communications equipment to the second communications equipment and an attenuation parameter for a second echo channel of the second communications equipment are acquired. A calculation process is similar to the foregoing process, and repeated description is not provided herein.

Optionally, after step 103, the present invention further includes the following step, which is not shown in the figure.

104. Measure a signal-to-noise ratio of each frequency channel number in each frequency band on the first communications equipment and compare each signal-to-noise ratio with a minimum threshold; and when a signal-to-noise ratio of a frequency channel number is less than the minimum threshold, acquire a first transmission frequency band that uses the frequency channel number as a highest frequency channel number.

The second communications equipment transmits signals according to the calculated PSD and a second transmission frequency band.

Generally, a higher frequency channel number has a lower signal-to-noise ratio. Therefore, during comparison, a signal-to-noise ratio of a low frequency channel number may be first compared with the minimum threshold. If it is greater than the minimum threshold, a signal-to-noise ratio of a higher frequency channel number is used to compare with the minimum threshold. When a signal-to-noise ratio of a frequency channel number is less than the minimum threshold, a first transmission frequency band that uses the frequency channel number as a highest frequency channel number is acquired.

Further, a process of transmitting signals in a reverse direction, from the second communications equipment to the first communications equipment, is included. The process specifically includes the following step, which is not shown in the figure.

105. Acquire a correspondence between both the PSD of transmitted signals of the first communications equipment and the PSD of transmitted signals of the second communications equipment and a signal-to-noise ratio of received signals of the second communications equipment; acquire a correspondence between the signal-to-noise ratio of received signals of the second communications equipment and the number of bits for bearing signals; and according to the foregoing two correspondences, use an optimization algorithm to calculate a PSD of transmitted signals of the first communications equipment and a PSD of transmitted signals of the second communications equipment, where the PSDs are PSDs when a rate of a line from the second communications equipment to the first communications equipment is the maximum.

With reference to the calculated PSD of transmitted signals of the first communications equipment and PSD of transmitted signals of the second communications equipment in step 103, where the PSDs are PSDs when the rate of the line from the first communications equipment to the second communications equipment is the maximum, acquire a PSD of transmitted signals of the first communications equipment and a PSD of transmitted signals of the second communications equipment, where the PSDs are PSDs when the rate of the line from the first communications equipment to the second communications equipment is the maximum and the rate of the line from the second communications equipment to the first communications equipment is the maximum.

In addition, a calculated signal-to-noise ratio of each frequency channel number in each frequency band on the second communications equipment may be acquired and compared with a minimum threshold; and when a signal-to-noise ratio of a frequency channel number is less than the minimum threshold, the second transmission frequency band that uses the frequency channel number as a highest frequency channel number is acquired. A manner of acquiring the second transmission frequency band is similar to the step of acquiring the first transmission frequency band. Repeated description is not provided herein. The second communications equipment transmits signals according to the calculated PSD and the second transmission frequency band.

Specifically, the PSD of transmitted signals of the first communications equipment and the PSD of transmitted signals of the second communications equipment calculated in step 103 are separately data sets; the PSD of transmitted signals of the first communications equipment and the PSD of transmitted signals of the second communications equipment calculated in step 105 are also separately data sets; and a final, that is, an optimal PSD of transmitted signals of the first communications equipment and PSD of transmitted signals of the second communications equipment are acquired by selecting separately intersections from the two data sets.

In this embodiment, a better PSD level of transmitted signals is acquired, in an actual application scenario, by acquiring a relationship between PSDs of transmitted signals and a signal-to-noise ratio of received signals and a relationship between a signal-to-noise ratio and the number of bits for bearing signals. Transmitting signals are transmitted according to the PSDs may reduce echo signals that are looped back in a hybrid loopback manner to a receiver of a local end, so as to reduce interference of transmitted signals in received signals and increase a line rate in a system, and a transmission frequency band is further acquired according to a calculated PSD and a new PSD of transmitted signals is calculated according to the transmission frequency band, so as to increase a signal transmission rate of the system.

Figure 3:
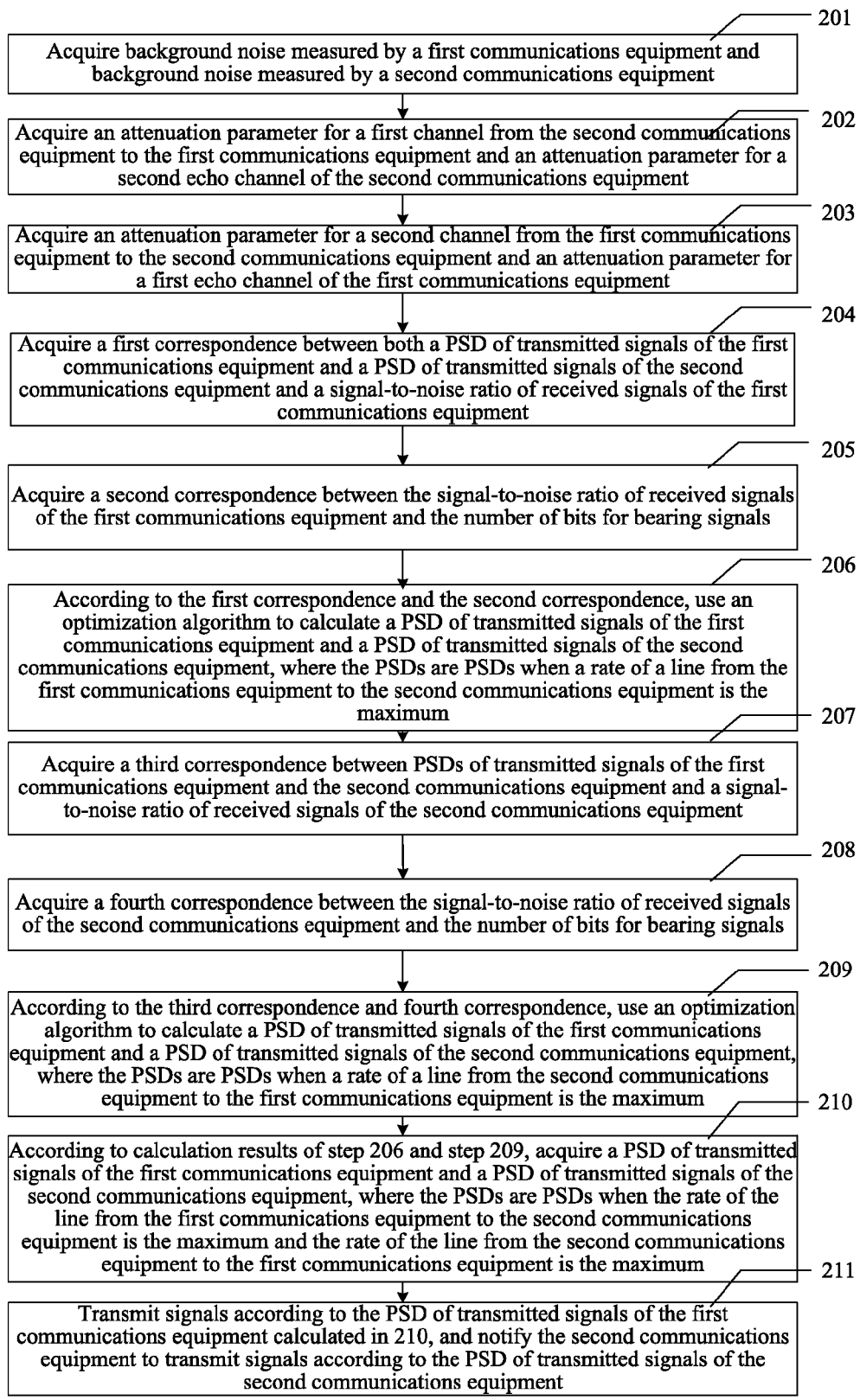
FIG. 3 is a schematic diagram of a second embodiment of the signal transmission method according to an embodiment of the present invention.

The following describes the solution by using a more specific embodiment, with reference to FIG. 3.

201. Acquire background noise measured by a first communications equipment and set the background noise as Co_Background_Noies_PSD, and acquire background noise measured by a second communications equipment and set the background noise as Cpe_Background_Noies_PSD, where both units are dBm/Hz.

202. Acquire an attenuation parameter for a first channel from the second communications equipment to the first communications equipment and set the attenuation parameter as Chn_Att1, and acquire an attenuation parameter for a second echo channel of the second communications equipment and set the attenuation parameter as Echo_Att2, where both units are dBm/Hz.

203. Acquire an attenuation parameter for a second channel from the first communications equipment to the second communications equipment and set the attenuation parameter as Chn_Att2, and acquire an attenuation parameter for a first echo channel of the first communications equipment and set the attenuation parameter as Echo_Att1, where both units are dBm/Hz.

204. Acquire a first correspondence between both a PSD of transmitted signals of the first communications equipment and a PSD of transmitted signals of the second communications equipment and a signal-to-noise ratio of received signals of the first communications equipment.

The specific method is: if transmitted signals of both the first communications equipment and the second communications equipment to have N sub-channels a carrier spacing of each sub-channel is $\nabla f$, the PSD of transmitted signals of the first communications equipment is X, $X=(X_1\ X_2, \ldots, X_N)$, the PSD of transmitted signals of the second communications equipment is Y, $Y=(Y_1\ Y_2, \ldots, Y_N)$, both units are dBm/Hz, and the number N of the sub-channels is determined by a preset frequency, then:

if a total signal transmission power of the first communications equipment is $P_{tx1}$, $$P_{tx1} = \sum_{i=1}^{N} X_i * \nabla f (dBm);$$

if a total signal transmission power of the second communications equipment is $P_{tx2}$, $$P_{tx2} = \sum_{i=1}^{N} Y_i * \nabla f (dBm).$$

Desired signals in received signals of the first communications equipment are determined by a value acquired after transmitted signals of the second communications equipment undergo a first channel attenuation gain, where a volume of the first channel attenuation gain may be acquired according to an attenuation parameter for a first channel; and the desired signals may be acquired by adding the PSD of transmitted signals of the second communications equipment to the attenuation parameter for the first channel. The size of the desired signals is Y+Chn_Att1, and the unit is dBm/Hz.

Noise in the signal-to-noise ratio of received signals of the first communications equipment is specifically composed of noise 11, noise 12, noise 13, and noise 14, where:

The noise 11 is background noise Co_Background_Noise_PSD of a line from the second communications equipment to the first communications equipment and measured by the first communications equipment, and the unit is dBm/Hz.

The noise 12 may be determined by a value acquired after noise that is generated when transmitted signals of the first communications equipment undergo digital-to-analog conversion undergoes a first echo channel attenuation gain, where a volume of the first echo channel attenuation gain may be acquired according to an attenuation parameter for a first echo channel. The noise generated when transmitted signals of the first communications equipment undergo digital-to-analog conversion may be calculated by using a relationship between the PSD of transmitted signals of the first communications equipment and a digital-to-analog conversion signal-to-noise ratio of the first communications equipment, where an indicator of the digital-to-analog conversion signal-to-noise ratio of the first communications equipment is Co_DAC_SNR, the Co_DAC_SNR may be acquired by a sinusoidal signal test, and the unit is dB. A peak-to-average ratio (peak-to-average ratio, PAR) of transmitted signals is acquired according to OFDM system specifications, the unit is dB, and a peak-to-average ratio of sinusoidal signals is generally 3 dB, and then a theoretical signal-to-noise ratio of the noise generated when transmitted signals of the first communications equipment undergo digital-to-analog conversion should be: (Co_DAC_SNR+3-PAR)dB, and a theoretical value of the noise generated when transmitted signals of the first communications equipment undergo digital-to-analog conversion is $[P_{tx1}-(Co\_DAC\_SNR+3-PAR)]$, where the unit is dBm/Hz If the noise 12 is Noise_PSD_12, then:

Noise_PSD_12=$[P_{tx1}-(Co\_DAC\_SNR+3-PAR)]$+Echo_Att1, where the unit is dBm/Hz.

The noise 13 may be determined by a value generated after a noise that is generated when transmitted signals of the second communications equipment undergo digital-to-analog conversion undergoes the first channel attenuation gain, where the volume of the first channel attenuation gain may be acquired according to the attenuation parameter for the first channel. The noise generated when transmitted signals of the second communications equipment undergo digital-to-analog conversion may be calculated by using the relationship between the PSD of transmitted signals of the second communications equipment and a digital-to-analog conversion signal-to-noise ratio of the second communications equipment, where an indicator of the digital-to-analog conversion signal-to-noise ratio of the second communications equipment is Cpe_DAC_SNR, the Cpe_DAC_SNR may be acquired by a sinusoidal signal test, the unit is dB. The PAR of transmitted signals is acquired according to the OFDM system, the unit is dB, and the peak-to-average ratio of sinusoidal signals is generally 3 dB, and then the theoretical signal-to-noise ratio of the noise generated when transmitted signals of the second communications equipment undergo digital-to-analog conversion should be: (Co_DAC_SNR+3-PAR)dB, and a theoretical value of the noise generated when transmitted signals of the second communications equipment undergo digital-to-analog conversion is $[P_{tx2}-(Cpe\_DAC\_SNR+3-PAR)]$, where the unit is dBm/Hz If the noise 13 is Noise_PSD_13, then:

Noise_PSD_13=$[P_{tx2}-(Cpe\_DAC\_SNR+3-PAR)]$+Chn_Att1, where the unit is dBm/Hz The noise 14 may be determined by noise generated when all signals received by the first communications equipment undergo analog-to-digital conversion. A value of all signals received by the first communications equipment is determined by a value (X+Echo_Att1)dBm/Hz acquired after the PSD of transmitted signals of the first communications equipment undergo the first echo channel attenuation gain, a value (Y+Chn_Att1) dBm/Hz acquired after the PSD of transmitted signals of the second communications equipment undergo the first channel attenuation gain, the noise 11, the noise 12, and the noise 13. To calculate a total power of all signals received by the first communications equipment if the total power is Co_ADC_input_power_linear and the unit is Wm, then $$Co\_ADC\_Input\_Power\_Linear = \sum_{i=1}^{N} [10^{0.1*Co\_Background\_Noise\_PSD_i} + 10^{0.1*(X_i+Echo\_Att1_i)} + 10^{0.1*(Y_i+Chn\_Att1_i)} + 10^{0.1*(Noise\_PSD\_12_i)} + 10^{0.1*(Noise\_PSD\_13_i)}] * \nabla f$$

The Co_ADC_input_power_linear is converted into a dB domain with the unit dBm and if the Co_ADC_input_power_linear in the dB domain is Co_ADC_input_power, then $$Co\_ADC\_input\_power = 10*\log_{10}(Co\_ADC\_input\_power\_linear)$$

A analog-to-digital conversion signal-to-noise ratio indicator of the received signals of the first communications equipment is Co_ADC_SNR and may be acquired by a sinusoidal signal test and the unit is dB. The PAR of transmitted signals is acquired according to the OFDM system and the unit is dB. The peak-to-average ratio of sinusoidal signals is generally 3 dB. Then, a theoretical signal-to-noise ratio of the noise generated when received signals of the first communications equipment undergo analog-to-digital conversion should be: (Co_ADC_SNR+3−PAR)dB. If the noise 14 is Co_ADC_Noise_PSD, then:

$$Co\_ADC\_Noise\_PSD = Co\_ADC\_input\_power - (Co\_ADC\_SNR + 3 - PAR)$$

where the unit is dBm/Hz

The noise in the signal-to-noise ratio of received signals of the first communications equipment is set to Co_Noise_PSD in dBm/Hz and is composed of the noise 11, noise 12, noise 13, and noise 14, where, specifically, $$Co\_Noise\_PSD = 10*\log_{10}(10^{0.1*(Noise\_PSD\_12)} + 10^{0.1*(Noise\_PSD\_13)} + 10^{0.1*(Co\_ADC\_Noise\_PSD)} + 10^{0.1*(Co\_Background\_Noise\_PSD)})$$

The signal-to-noise ratio of received signals of the first communications equipment is a ratio of the desired signals to the noise, where the desired signals and the noise are in the signals received by the first communications equipment. When the signal-to-noise ratio is converted into a dB domain, it can be acquired by subtracting noise in the dB domain from desired signals in the dB domain. The signal-to-noise ratio of received signals of the first communications equipment is calculated according to Co_Noise_PSD and the desired signals of the first communications equipment. If the signal-to-noise ratio whose unit is dB is Co_SNR, then $$Co\_SNR = Y + Chn\_Att1 - Co\_Noise\_PSD$$

The Co_SNR whose unit is dB is converted into a linear value, and if the signal-to-noise ratio of received signals of the first communications equipment is Co_SNR_linear, then, according to linear conversion of the Co_SNR, $$Co\_SNR = 10*\log_{10}(Co\_SNR\_linear)$$

Therefore, a relationship is acquired, where the relationship is between the signal-to-noise ratio Co_SNR_linear of received signals of the first communications equipment and both the PSD, that is, X, of transmitted signals of the first communications equipment, and the PSD, that is, Y, of transmitted signals of the second communications equipment.

205. Acquire a second correspondence between the signal-to-noise ratio of received signals of the first communications equipment and the number of bits for bearing signals.

The specific method is acquiring the following relational expression according to the Shannon channel capacity formula:

$$L_1 = \sum_{i=1}^{N} (\text{Log}_2(1 + Co\_SNR\_linear_i / SNR\_Gap\_Linear))$$

where Co_SNR_linear$_i$ is the signal-to-noise ratio of received signals of the first communications equipment, L$_1$ is a total capacity of N sub-channels and is equal to, in calculation, the number of bits for the bearing signals of the first communications equipment, the number of bits for the bearing signals of the first communications equipment is determined by a specification or an actual channel situation, Log$_2$(1+Co_SNR_linear$_i$/SNR_Gap_Linear) is a capacity of each sub-channel, and SNR_Gap_liner is a signal-to-noise ratio difference specified according to a modulation and coding method and is a known quantity.

206. According to the first correspondence and the second correspondence, use an optimization algorithm to calculate a PSD of transmitted signals of the first communications equipment and a PSD of transmitted signals of the second communications equipment, where the PSDs are PSDs when a rate of a line from the first communications equipment to the second communications equipment is the maximum.

207. Acquire a third correspondence between PSDs of transmitted signals of the first communications equipment and the second communications equipment and a signal-to-noise ratio of received signals of the second communications equipment; an acquiring method is similar to that in step 204 and repeated description is not provided herein.

208. Acquire a fourth correspondence between the signal-to-noise ratio of received signals of the second communications equipment and the number of bits for bearing signals; an acquiring method is similar to that in step 205 and repeated description is not provided herein.

209. According to the third correspondence and fourth correspondence, use an optimization algorithm to calculate a PSD of transmitted signals of the first communications equipment and a PSD of transmitted signals of the second communications equipment, where the PSDs are PSDs when a rate of a line from the second communications equipment to the first communications equipment is the maximum.

210. According to calculation results of step 206 and step 209, acquire a PSD of transmitted signals of the first communications equipment and a PSD of transmitted signals of the second communications equipment, where the PSDs are PSDs when the rate of the line from the first communications equipment to the second communications equipment is the maximum and the rate of the line from the second communications equipment to the first communications equipment is the maximum.

211. Transmit signals according to the PSD of transmitted signals of the first communications equipment calculated in 210, and instruct the second communications equipment to transmit signals according to the PSD of transmitted signals of the second communications equipment.

The first communications equipment transmits signals according to the PSD, that is, X, of transmitted signals of the first communications equipment, and notifies the second communications equipment to transmit signals according to the PSD, that is, Y, of transmitted signals of the second communications equipment.

In this embodiment, further, according to the first correspondence, the second correspondence, the third correspondence, and the fourth correspondence, the PSD of transmitted signals of the first communications equipment and the PSD of transmitted signals of the second communications equipment are calculated, so that calculation results are more accurate.

Figure 4:
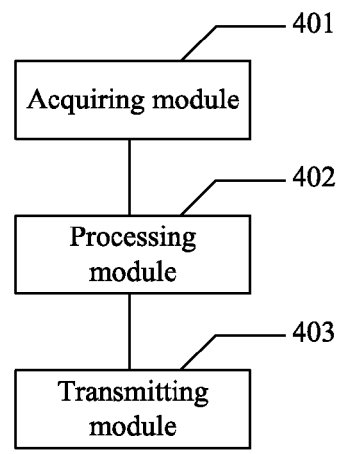
FIG. 4 is a schematic diagram of a first embodiment of a communications equipment according to an embodiment of the present invention.

Referring to FIG. 4, a communications equipment, which may specifically be a central office equipment or a terminal equipment, includes a number of modules.

An acquiring module 401 is configured to acquire a first correspondence between both a PSD of transmitted signals of the communications equipment and a PSD of transmitted signals of a peer communications equipment and a signal-to-noise ratio of received signals of the communications equipment, and to acquire a second correspondence between the signal-to-noise ratio of received signals of the communications equipment and the number of bits for bearing signals. The signal-to-noise ratio of received signals of the communications equipment is a ratio of desired signals to noise. The desired signals and the noise are in signals received by the communications equipment.

A processing module 402 is configured to, according to the first correspondence and the second correspondence use an optimization algorithm to calculate a PSD of transmitted signals of the communications equipment and a PSD of transmitted signals of the peer communications equipment. The PSDs are PSDs when a rate of a line from the communications equipment to the peer communications equipment is the maximum.

A transmitting module 403 is configured to transmit signals according to the PSD of transmitted signals of the communications equipment calculated by the processing module.

Further, the acquiring module 401 is further configured to acquire an attenuation parameter for a first channel from the peer communications equipment to the communications equipment and an attenuation parameter for a first echo channel of the communications equipment.

Further, the processing module 402 is further configured to measure a signal-to-noise ratio of each frequency channel number in each frequency band and compare each signal-to-noise ratio with a minimum threshold; and acquire, when a signal-to-noise ratio of a frequency channel number is less than the minimum threshold, a first transmission frequency band that uses the frequency channel number as a highest frequency channel number.

Further, the processing module 402 is further configured to, in a case in which the peer communications equipment transmits signals to the communications equipment and the transmitting module 403 does not transmit signals, acquire a PSD of transmitted signals of the peer communications equipment and measure a PSD of signals received by the communications equipment, and subtract the PSD of the signals received by the communications equipment from the acquired PSD of transmitted signals of the peer communications equipment to calculate the attenuation parameter for the first channel.

In a case in which the transmitting module 403 transmits signals to the peer communications equipment and the peer communications equipment does not transmit signals, acquire a PSD of transmitted signals of the communications equipment and measure a PSD of signals that have passed through an echo channel of the communications equipment, and subtract the PSD of the signals that have passed through the echo channel of the communications equipment from the PSD of transmitted signals of the transmitting module 403 to calculate the attenuation parameter for the first echo channel.

Further, the processing module 402 is further configured to acquire a correspondence between both the PSD of transmitted signals of the communications equipment and the PSD of transmitted signals of the peer communications equipment and a signal-to-noise ratio of received signals of the peer communications equipment; acquire a correspondence between the signal-to-noise ratio of received signals of the peer communications equipment and the number of bits for bearing signals; according to the foregoing two correspondences, use an optimization algorithm to calculate a PSD of transmitted signals of the communications equipment and a PSD of transmitted signals of the peer communications equipment, where the PSDs are PSDs when a rate of a line from the peer communications equipment to the communications equipment is the maximum. With reference to the calculated PSD of transmitted signals of the communications equipment and PSD of transmitted signals of the peer communications equipment, where the PSDs are PSDs when the rate of the line from the communications equipment to the peer communications equipment is the maximum, acquire a PSD of transmitted signals of the communications equipment and a PSD of transmitted signals of the peer communications equipment, where the PSDs are PSDs when the rate of the line from the communications equipment to the peer communications equipment is the maximum and the rate of the line from the peer communications equipment to the communications equipment is the maximum.

Further, the transmitting module 403 is further configured to notify the peer communications equipment to transmit signals according to the PSD of transmitted signals of the peer communications equipment calculated by the processing module.

Further, the communications equipment may perform operations according to specific manners of the first communications equipment in the foregoing method embodiment. The content is the same and repeated description is not provided herein.

Figure 5:
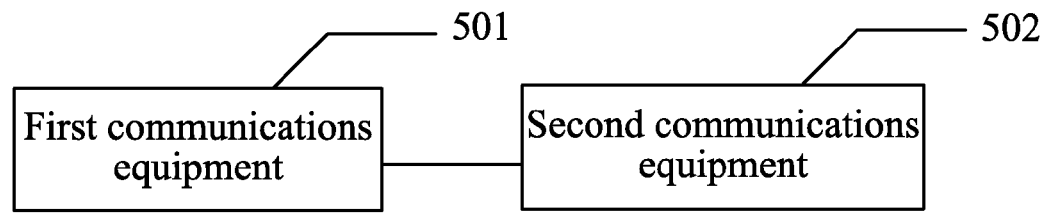
FIG. 5 is a schematic diagram of a second embodiment of a communications equipment according to an embodiment of the present invention.

Referring to FIG. 5, a communications system includes a central office equipment and a terminal equipment connected by using a channel. The central office equipment or the terminal equipment is a first communications equipment and correspondingly, the terminal equipment or the central office equipment is a second communications equipment.

The first communications equipment acquires a first correspondence between both a PSD of transmitted signals of the first communications equipment and a PSD of transmitted signals of the second communications equipment and a signal-to-noise ratio of received signals of the first communications equipment, where the signal-to-noise ratio of received signals of the first communications equipment is a ratio of desired signals to noise, where the desired signals and the noise are in signals received by the first communications equipment.

The first communications equipment acquires a second correspondence between the signal-to-noise ratio of received signals of the first communications equipment and the number of bits for bearing signals. According to the first correspondence and second correspondence, the first communications equipment uses an optimization algorithm to calculate a PSD of transmitted signals of the first communications equipment and a PSD of transmitted signals of the second communications equipment, where the PSDs are PSDs when a rate of a line from the first communications equipment to the second communications equipment is the maximum. The first communications equipment and second communications equipment transmit signals according to the calculated PSDs.

Further, the first communications equipment acquires a correspondence between both the PSD of transmitted signals of the first communications equipment and the PSD of transmitted signals of the second communications equipment and a signal-to-noise ratio of received signals of the second communications equipment; acquires a correspondence between the signal-to-noise ratio of received signals of the second communications equipment and the number of bits for bearing signals; according to the foregoing two correspondences, uses an optimization algorithm to calculate a PSD of transmitted signals of the first communications equipment and a PSD of transmitted signals of the second communications equipment, where the PSDs are PSDs when a rate of a line from the second communications equipment to the first communications equipment is the maximum; and with reference to the calculated PSD of transmitted signals of the first communications equipment and PSD of transmitted signals of the second communications equipment, where the PSDs are PSDs when the rate of the line from the first communications equipment to the second communications equipment is the maximum, acquires a PSD of transmitted signals of the first communications equipment and a PSD of transmitted signals of the second communications equipment, where the PSDs are PSDs when the rate of the line from the first communications equipment to the second communications equipment is the maximum and the rate of the line from the second communications equipment to the first communications equipment is the maximum.

The first communications equipment and second communications equipment transmit signals according to the calculated PSDs.

Further, the first communications equipment and the second communications equipment may perform operations according to specific manners in the foregoing method embodiment. The content is the same and repeated description is not provided herein.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The foregoing is detailed description of a service processing method, system, and equipment provided in the embodiments of the present invention. This specification describes principles and implementation manners of the present invention by using specific examples. Description of the foregoing embodiments is merely intended to help understand the method and its core idea of the present invention. Meanwhile, a person of ordinary skill in the art may make modifications to a specific implementation manner and an application scope according to the idea of the present invention. In conclusion, the content of this specification shall not be construed as a limitation on the present invention.

What is claimed is:

1. A signal transmission method, comprising:
acquiring, by a first communications equipment, a first correspondence between both a first power spectral density (PSD) of transmitted signals of the first communications equipment and a first PSD of transmitted signals of a second communications equipment and a signal-to-noise ratio of received signals of the first communications equipment, wherein the signal-to-noise ratio of received signals of the first communications equipment is a ratio of desired signals to noise, wherein the desired signals and the noise are in signals received by the first communications equipment;

acquiring a second correspondence between the signal-to-noise ratio of received signals of the first communications equipment and a number of bits for bearing signals;

using an optimization algorithm to calculate according to the first correspondence and the second correspondence, a second PSD of transmitted signals of the first communications equipment and a second PSD of transmitted signals of the second communications equipment, wherein the first PSDs and the second PSDs are PSDs when a rate of transmission on a line from the first communications equipment to the second communications equipment is maximum; and transmitting signals according to the second PSDs of transmitted signals of the first communications equipment.

2. The method according to claim 1, wherein acquiring the first correspondence comprises acquiring the first correspondence by using a relationship between the noise and both the first PSD of transmitted signals of the first communications equipment and the first PSD of transmitted signals of the second communications equipment, and also a relationship between the desired signals and the first PSD of transmitted signals of the first communications equipment.

3. The method according to claim 1, wherein acquiring the second correspondence comprises calculating the second correspondence using a Shannon channel capacity formula.

4. The method according to claim 1, wherein, before the first correspondence is acquired, the method further comprises acquiring an attenuation parameter for a first channel from the second communications equipment to the first communications equipment and an attenuation parameter for a first echo channel of the first communications equipment.

5. The method according to claim 4, further comprising, when the second communications equipment transmits signals to the first communications equipment and the first communications equipment does not transmit signals, acquiring a third PSD of transmitted signals of the second communications equipment and measuring a fourth PSD of signals received by the first communications equipment, and subtracting the fourth PSD of the signals received by the first communications equipment from the acquired third PSD of transmitted signals of the second communications equipment to calculate the attenuation parameter for the first channel; and in a case in which the first communications equipment transmits signals to the second communications equipment and the second communications equipment does not transmit signals, acquiring a fifth PSD of transmitted signals of the first communications equipment and measuring a sixth PSD of signals that have passed through an echo channel of the first communications equipment, and subtracting the sixth PSD of the signals that have passed through the echo channel of the first communications equipment from the fifth PSD of transmitted signals of the first communications equipment to obtain the attenuation parameter for the first echo channel through calculation.

6. The method according to claim 1, wherein the method further comprises measuring signal-to-noise ratios on frequencies in frequency bands on the first communications equipment and comparing each signal-to-noise ratio with a minimum threshold, and acquiring, when a signal-to-noise ratio on a frequency is less than the minimum threshold, a first transmission frequency band that uses the frequency as a highest frequency.

7. The method according to claim 1, wherein the method further comprises:
acquiring a first correspondence between both a third PSD of transmitted signals of the first communications equipment and a third PSD of transmitted signals of the second communications equipment and a signal-to-noise ratio of received signals of the second communications equipment;
acquiring a second correspondence between the signal-to-noise ratio of received signals of the second communications equipment and the number of bits for bearing signals;
according to the first and second correspondences, using an optimization algorithm to calculate a fourth PSD of transmitted signals of the first communications equipment and a fourth PSD of transmitted signals of the second communications equipment, wherein the fourth PSDs are PSDs when a rate of a line from the second communications equipment to the first communications equipment is the maximum; and
with reference to the calculated fourth PSD of transmitted signals of the first communications equipment and fourth PSD of transmitted signals of the second communications equipment, wherein the fourth PSDs are PSDs when the rate of the line from the first communications equipment to the second communications equipment is the maximum, acquiring a fifth PSD of transmitted signals of the first communications equipment and a fifth PSD of transmitted signals of the second communications equipment, wherein the fifth PSDs are PSDs when the rate of the line from the first communications equipment to the second communications equipment is the maximum and the rate of the line from the second communications equipment to the first communications equipment is the maximum.

8. A communications equipment, comprising:
a processor; and
a computer-readable storage medium storing a program to be executed by the processor, the program including instructions for:
acquiring a first correspondence between both a first power spectral density (PSD) of transmitted signals of the communications equipment and a first PSD of transmitted signals of a peer communications equipment and a signal-to-noise ratio of received signals of the communications equipment, and acquiring a second correspondence between the signal-to-noise ratio of received signals of the communications equipment and a number of bits for bearing signals, wherein the signal-to-noise ratio of received signals of the communications equipment is a ratio of desired signals to noise, wherein the desired signals and the noise are in signals received by the communications equipment;
using, according to the first correspondence and the second correspondence, an optimization algorithm to calculate a second PSD of transmitted signals of the communications equipment and a second PSD of transmitted signals of the peer communications equipment, wherein the first PSDs and the second PSDs are PSDs when a rate of transmission on a line from the communications equipment to the peer communications equipment is the maximum; and
a transmitter, configured to transmit signals according to the second PSDs of transmitted signals of the communications equipment.

9. The communications equipment according to claim 8, wherein the program further includes instructions for acquiring an attenuation parameter for a first channel from the peer communications equipment to the communications equipment and an attenuation parameter for a first echo channel of the communications equipment.

10. The communications equipment according to claim 8, wherein the program further includes instructions for measuring a signal-to-noise ratio of each frequency channel number in each frequency band and comparing each signal-to-noise ratio with a minimum threshold and, when a signal-to-noise ratio of a frequency channel number is less than the minimum threshold, acquiring a first transmission frequency band that uses the frequency channel number as a highest frequency channel number.

11. The communications equipment according to claim 8, wherein the program further includes instructions for, in a case in which the peer communications equipment transmits signals to the communications equipment and the transmitter does not transmit signals, acquiring a third PSD of transmitted signals of the peer communications equipment and measuring a fourth PSD of signals received by the communications equipment, and subtracting the fourth PSD of the signals received by the communications equipment from the acquired third PSD of transmitted signals of the peer communications equipment to calculate an attenuation parameter for a first channel; and
in case in which the transmits signals to the peer communications equipment and the peer communications equipment does not transmit signals, acquiring a fifth PSD of transmitted signals of the communications equipment and measuring a sixth PSD of signals that have passed through an echo channel of the communications equipment, and subtracting the sixth PSD of the signals that have passed through the echo channel of the communications equipment from the fifth PSD of transmitted signals of the transmitter to calculate an attenuation parameter for a first echo channel.

12. The communications equipment according to claim 8, wherein the program further includes instructions for acquiring a first correspondence between both a third PSD of transmitted signals of the communications equipment and a third PSD of transmitted signals of the peer communications equipment and a signal-to-noise ratio of received signals of the peer communications equipment, acquiring a second correspondence between the signal-to-noise ratio of received signals of the peer communications equipment and the number of bits for bearing signals, and using, according to the first and second correspondences, an optimization algorithm to calculate a fourth PSD of transmitted signals of the communications equipment and a fourth PSD of transmitted signals of the peer communications equipment, wherein the fourth PSDs are PSDs when a rate of a line from the peer communications equipment to the communications equipment is the maximum; and
with reference to the calculated fourth PSD of transmitted signals of the communications equipment and fourth PSD of transmitted signals of the peer communications equipment, wherein the fourth PSDs are PSDs when the rate of the line from the communications equipment to the peer communications equipment is the maximum, acquiring a fifth PSD of transmitted signals of the communications equipment and a fifth PSD of transmitted signals of the peer communications equipment, wherein the fifth PSDs are PSDs when the rate of the line from the communications equipment to the peer communications equipment is the maximum and the rate of the line from the peer communications equipment to the communications equipment is the maximum.

13. The communications equipment according to claim 8, wherein the transmitter is further configured to instruct the peer communications equipment to transmit signals according to the second PSD of transmitted signals of the peer communications equipment.

14. The communications equipment according to claim 8, wherein the communications equipment is an access equipment or a terminal equipment.

15. A communications system, comprising:
  a first communications equipment serving as a central office equipment;
  a second communications equipment serving as a terminal equipment; and
  a channel, wherein the first communications equipment and the second communications equipment are connected by the channel;
  wherein the first communications equipment acquires a first correspondence between both a first power spectral density (PSD) of transmitted signals of the first communications equipment and a first PSD of transmitted signals of the second communications equipment and a signal-to-noise ratio of received signals of the first communications equipment, wherein the signal-to-noise ratio of received signals of the first communications equipment is a ratio of desired signals to noise, wherein the desired signals and the noise are in signals received by the first communications equipment;
  wherein the first communications equipment acquires a second correspondence between the signal-to-noise ratio of received signals of the first communications equipment and a number of bits for bearing signals;
  wherein, according to the first correspondence and the second correspondence, the first communications equipment uses an optimization algorithm to calculate a second PSD of transmitted signals of the first communications equipment and a second PSD of transmitted signals of the second communications equipment, wherein the first PSDs and the second PSDs are PSDs when a rate of transmission on a line from the first communications equipment to the second communications equipment is the maximum; and
  wherein the first communications equipment and second communications equipment transmit signals according to the calculated second PSDs.

16. The system according to claim 15, wherein the first communications equipment acquires a first correspondence between both a third PSD of transmitted signals of the first communications equipment and a third PSD of transmitted signals of the second communications equipment and a signal-to-noise ratio of received signals of the second communications equipment, acquires a second correspondence between the signal-to-noise ratio of received signals of the second communications equipment and the number of bits for bearing signals; uses, according to the first and second correspondences, an optimization algorithm to calculate a fourth PSD of transmitted signals of the first communications equipment and a fourth PSD of transmitted signals of the second communications equipment, wherein the fourth PSDs are PSDs when a rate of a line from the second communications equipment to the first communications equipment is the maximum; and
  with reference to the calculated fourth PSD of transmitted signals of the first communications equipment and fourth PSD of transmitted signals of the second communications equipment, wherein the fourth PSDs are PSDs when the rate of the line from the first communications equipment to the second communications equipment is the maximum, acquires a fifth PSD of transmitted signals of the first communications equipment and a fifth PSD of transmitted signals of the second communications equipment, wherein the fifth PSDs are PSDs when the rate of the line from the first communications equipment to the second communications equipment is the maximum and the rate of the line from the second communications equipment to the first communications equipment is the maximum.

17. The system according to claim 16, wherein, the first communications equipment and the second communications equipment transmit signals according to the calculated PSDs.

* * * * *